United States Patent Office 2,879,199
Patented Mar. 24, 1959

2,879,199
NEMATOCIDE

Milton Kosmin and Van R. Gaertner, Dayton, Ohio, assignors to Monsanto Chemical Company, St. Louis, Mo., a corporation of Delaware No Drawing. Application February 23, 1956
Serial No. 567,069

4 Claims. (Cl. 167—33)

This invention relates to N-alkyl-N-(tridecylpolyoxyethylene)morpholinium salts having the formula

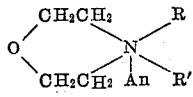

wherein An is the anion of a strong organic or inorganic acid, R is a lower alkyl radical, and R' is a tridecylpolyoxyethylene radical as further defined hereinbelow; to methods of making the same; and to compositions and methods for the application of the present novel compounds as nematocides.

The compounds of this invention can in many instances be most conveniently prepared by treating an N-loweralkylmorpholine with a tridecylpolyoxyethylene ester having the formula R'—An, where An is as defined hereinabove, and may be, e.g., $CH_3SO_4^-$, $CH_3C_6H_4SO_3^-$, etc., and R' is the tridecylpolyoxyethylene residue derived by removal of the terminal hydroxy group from the condensation product of ethylene oxide with mixture of isomeric primary tridecyl alcohols, said alcohols being derived by the catalytic reaction of carbon monoxide and hydrogen with an olefinic material selected from the class consisting of triisobutylene and tetrapropylene, said condensation product containing at least 5 moles and not in excess of 20 moles of ethylene oxide per mole of tridecyl alcohol.

The manufacture of alcohols by the Oxo reaction, via the condensation of carbon monoxide and hydrogen with olefins in the presence of catalysts such as cobalt carbonyl, thorium and magnesium oxides or allied catalytic materials, is described in Bureau of Mines Report of Investigations No. 4270, dated June 1948. When polymerized olefins such as triisobutylene or tetrapropylene are used for the manufacture of alcohols by the Oxo reaction, there is obtained a complex mixture of alcohols from which there may be separated a fraction consisting substantially only of tridecyl alcohols boiling in the range of from 226–264° C. (ASTM distillation) at atmospheric pressure. By condensation of this tridecyl alcohol fraction with from 5 to 20 moles of ethylene oxide per mole of tridecanol, there is obtained an ether alcohol of outstanding surface-active properties as described in the copending application of one of the present inventors, Milton Kosmin, Serial No. 492,777, filed March 7, 1955, assigned to the same assignee as the present invention. In accordance with the present invention, the residue derived by removal of the terminal hydroxyl group from the ether alcohol prepared as described above is incorporated in a quaternary morpholinium salt to produce products of utility as nematocides.

The preparation of the presently useful tridecyl alcoholethylene oxide condensates is illustrated by the following example:

*Example 1*

To 310 g. (1.55 moles) of a tridecyl alcohol fraction prepared by the Oxo reaction and boiling in the range of from 226–264° C., contained in a one liter flask fitted with a stirrer, thermometer and gas disperser, was added 3.1 g. of potassium hydroxide (as a catalyst). The mixture was then heated to 145–155° C. and ethylene oxide was passed into the alcohol-KOH mixture until 10 moles of ethylene oxide had combined with the alcohol. The product was a yellowish oil.

Similarly, by continuing the addition of ethylene oxide, products can be obtained wherein an average of 7.5, 8.5, 10, 15 or 20 moles of ethylene oxide have condensed with each mole of the alcohol reacted, the condensation products containing higher ethylene oxide to alcohol ratios being thicker and more viscous oils than the lower condensation products.

The products obtained by the above procedure are ether alcohols which may be represented by the formula $C_{13}H_{27}(OCH_2CH_2)_nOH$ wherein $n$ represents the average number of ethylene oxide moles condensed per mole of tridecyl alcohol and ranges from 5 to 20, and $C_{13}H_{27}$ represents the residue of the Oxo process tridecyl alcohol.

As mentioned above, the present quaternary morpholinium salts are most conveniently prepared by reacting an N-lower-alkylmorpholine with an ester of the tridecylpolyoxyethylene alcohol prepared as described above. Particularly preferred as the anion of the ester are sulfonate and sulfate anions, such as $CH_3SO_3^-$, $CH_3C_6H_4SO_3^-$, $CH_3SO_4^-$, etc. The preparation of esters of the present ether alcohol is illustrated by the following example:

*Example 2*

A solution was prepared of 57.5 g. (0.10 mole) of a tridecyl alcohol-ethylene oxide condensation product containing a calculated average of 8.5 moles of ethylene oxide per mole of tridecyl alcohol, in 500 ml. of anhydrous ether. After the solution had been filtered to remove a small amount of solids, there were added to it 19.1 g. (0.10 mole) of p-toluenesulfonyl chloride and 7.9 g. of anhydrous pyridine. The oil which formed became a flocculent solid on gentle heating and stirring. After it had been heated to 30–35° for 30 minutes, the mixture was stirred at room temperature for 2 hours, let stand an hour, and decanted through a filter to remove the oily, water-soluble, foamy precipitate. The clear ether layer was evaporated down to about 150° C./0.1 mm., leaving the p-toluenesulfonate ester of the tridecylpolyoxyethylene alcohol as a brown oil, soluble in water, ether, ethanol, acetone and benzene.

Similarly, by conventional esterification procedures, there may be prepared esters such as the esterified product of ethyl hydrogen sulfate and the condensation product of Oxo process tridecyl alcohol and 10 moles of ethylene oxide; the esterification product of propyl hydrogen sulfate and the condensation product of Oxo process tridecyl alcohol and 7.5 moles of ethylene oxide, etc.

In the preferred process for preparing the present morpholinium salts, an N-lower-alkylmorpholine is contacted with a tridecylpolyoxyethylene ester prepared as described above. This reaction may be represented by the following equation:

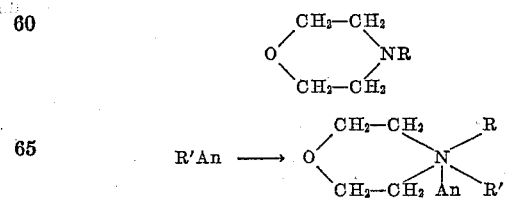

where R is lower alkyl, R' is the residue derived by removing the terminal hydroxyl radical from the condensation product of an Oxo process tridecyl alcohol and five to twenty moles of ethylene oxide, and An represents an anion of a strong organic or inorganic acid. In carrying out this reaction, the ester and N-alkylmorpholine will usually be contacted in approximately equimolecular proportions, although an excess of the more readily available reactant may be used if desired. Preferably, the reaction mixture is heated to accelerate the formation of the quaternary salt product; any temperatures up to just below the decomposition temperatures of the reaction components may be used. It is sometimes convenient to carry out the reaction in the presence of inert solvents or diluents to facilitate stirring, etc. Suitable inert solvents are, for example, hexane, benzene, ethanol, dioxane, etc. The quaternary salt may be isolated by cooling the reaction mixture and collecting the product which separates, or by adding to the reaction mixture a liquid which is a non-solvent for the quaternary, etc.

The preparation of the present compounds by the presently preferred method is illustrated by the following example:

Example 3

A mixture of 14.6 g. (0.020 mole) of the tridecylpolyoxyethylene p-toluenesulfonate prepared as described in Example 2 and 2.02 g. (0.020 mole) of N-methylmorpholine was heated for approximately 16 hours at 130–150° C. After cooling, the reaction mixture was treated with 300 ml. of ether, which caused a brown oil to separate. The ether layer was decanted and the oil was shaken with another 200 ml. of ether and let stand three days. After removal of 1.9 g. of the p-toluenesulfonate salt of N-methylmorpholine (tan crystalline solid, m. 75–95° C.) which separated, the ether solution was evaporated at below 1 mm. for several hours to isolate N - methyl - N - (tridecylpolyoxyethylene)morpholinium p-toluenesulfonate, as a heavy, viscous brown oil.

The quaternary salts prepared in the manner described above can be converted by usual methods to the corresponding quaternary hydroxide salts, for example, by reaction of the sulfate or sulfonate salts with barium hydroxide, or by treatment of the morpholinium salts with an anion exchanger. By treatment with barium chloride, the quaternary morpholinium sulfate or sulfonate salts may be converted to the corresponding quaternary chloride salts, and the other halide salts of the present morpholinium compounds may be prepared similarly.

Another method of preparing the present compounds, though less preferred than that described above, consists of preparing a tridecylpolyoxyethylene halide, from the ether alcohol synthesized as described in the first example above, condensing this halide with morpholine by conventional procedures to produce N-(tridecylpolyoxyethylene)morpholine, and subsequently quaternizing the tertiary amine so prepared, using a quaternizing agent capable of introducing a lower alkyl radical into the product. Suitable quaternizing agents for this purpose are, for example, alkyl halides such as methyl, ethyl, amyl, isopropyl or hexyl chloride, bromide or iodide, or dialkyl sulfates such as dimethyl sulfate, or alkyl sulfonates such as methyl p-toluenesulfonate, isohexyl p-toluenesulfonate, etc. This method provides an alternative approach for the synthesis of the same compounds in the invention as are herein provided by the process of quaternizing an N-lower-alkylmorpholine with a tridecylpolyoxyethylene ester, as described above.

The products of the present reaction are generally stable, water-soluble compounds which range from heavy viscous oils to solid materials. They are useful for a wide variety of chemical and agricultural purposes. For example, the present morpholinium compounds are useful as destaticizers for synthetic fibers, and may be applied to fabrics such as nylon, polyacrylonitrile, etc., from aqueous solution at a rate of, say, 0.1% by weight, to reduce the electrostatic charge which tends to accumulate on the cloth. The compounds of the invention are also useful surface-active agents, and may be dissolved in water to give a foamy, soapy solution of utility in textile treatments, i.e., in dyeing, bleaching and mordanting operations, etc. The morpholinium salts of the invention are also biological toxicants and may be used as bactericides or fungicides, and in other, agricultural applications. They are particularly useful as nematocides.

The following examples described the application of the present compounds as nematocides.

Example 4

This example describes a laboratory evaluation of the nematocidal effectiveness of the present quaternary salts.

It is known that a nematode when placed in water flexes its body at a more or less constant rate and that the effect of a nematocide can be estimated by counting the rate of flexing action. The motility is observed through a microscope and the number of flexures counted. The effect of a nematocide may be expressed as a percentage of a normal flexing rate of a control dispersion of nematodes not containing a nematocidal agent.

An emulsion of the product of Example 3 was prepared by dissolving a gram of the sample in a few mls. of acetone, adding an emulsifying agent known to the trade as "Tween 20" and reputed to be a polyoxyethylene sorbitan monolaurate, and bringing the mixture up to 50 ml. with water, to give an aqueous emulsion containing 2% by weight of the morpholinium salt. An aqueous suspension of the nematode *Panegrellus redivivus* was placed in a Stender dish and a concentration of 0.1% of the morpholinium p-toluenesulfonate, calculated on the volume of the nematode suspension, was added to the dish. Afterwards, the motility of the nematodes was estimated at regular intervals as compared to a control nematode suspension containing no morpholinium salt. It was found that after 24 hours, nematodes in the suspension containing the morpholinium salt were completely motionless, whereas the motility of the nematodes in the control dispersion not containing an added nematocidal agent was still as great as at the start of the test.

Example 5

This example describes an evaluation of the nematocidal activity of the present morpholinium compounds in soil.

A container holding 500 g. of uninfected soil was inoculated with the root node nematode *Meloidogyne* spp. by addition to the container of 25 ml. of a suspension prepared by grinding 2 g. of the washed roots of plants infected by the nematodes in 100 ml. of water. After inoculation, sufficient water was added to bring the potting soil to one-half field capacity. The infected soil was then treated with a drench of an emulsion of the morpholinium salt of Example 3 prepared as described above, to give an 0.1% concentration of the morpholinium salt in the soil. The container was capped and allowed to stand one week, after which a two-week old Marglobe tomato seedling was transferred to it. An untreated but similarly inoculated control was also planted. After a growing period of two months, the tomato plants were harvested and the roots washed and examined for evidence of infection. It was found that the 0.1% concentration of the N-methyl-N-(tridecylpolyoxyethylene)-morpholinium p-toluenesulfonate of Example 3 substantially completely suppressed nematode infection in the plants grown in the infected soil, the traces of infection being barely detectable, whereas the control plant exposed to the infection without addition of a protective chemical was heavily infected.

Repetition of the above experiment using an 0.01 concentration of the morpholinium salt in the soil showed that this lower concentration again gave substantially complete protection of the plants from nematode attack.

The activity of the present compounds is surprising since not all quaternary salts are nematocidal. For example, allyltrimethylammonium chloride, tested under the condition described in Example 4, at 0.1% after 24 hours produced only a 20% decrease in the activity of the nematodes suspended in the aqueous medium, the nematodes exposed to this quaternary salt being 80% as active as those of the controlled untreated suspension. At lower concentrations, e.g., 0.01%, the allyltrimethylammonium chloride is completely ineffective. Furthermore, the tridecylpolyoxyethylene p-toluenesulfonate of Example 2 is completely ineffective as a nematocide at 0.1% concentration, as tested by the procedure of Example 4.

The present morpholinium salts are effective in eliminating or suppressing nematode activity when applied to the soil at a rate of 50 to 300 lbs. per acre. Usually concentrations of 100 to 200 lbs. per acre will produce a useful degree of nematode control in soil at an average infestation level; lightly infected areas may be treated effectively with smaller concentrations. The compounds may be applied to the soil, e.g., as dusts, as compositions together with fertilizers, or by injection into the soil. Since the present compounds are water soluble, they may be sprayed onto soil in aqueous solution or applied to fields in irrigation water. If desired, dispersions or oil-in-water emulsions of the present compounds may be prepared by mixing them with a surface-active agent such as a soap, e.g., sodium laurate, a non-ionic surface-active agent such as the reaction product of oleyl alcohol and excess ethylene oxide, etc., and diluting the mixture with water; an organic solvent may or may not be added to the mixture. However, inasmuch as the present compounds are themselves surface-active, generally simple solution in water will give a formulation suitable for direct application to soil for the control of nematodes.

In addition to use in soils, the compositions of the invention may also be applied to other nematode environments such as greenhouse plotting mixtures and other soil substitutes. The morpholinium salts of the invention may also be used to destroy animal endoparasitic worms such as flukes and tapeworms during the soil phase of their life cycle, and may usefully be applied, for example, to barnyards and other soils which it is desired to sterilize.

While the invention has been described with reference to particular compounds, methods, etc., it will be appreciated that the invention is capable of other modifications and variations and it is desired to be limited only as indicated in the appended claims.

What is claimed is:

1. The method of controlling nematodes which comprises exposing said nematodes to a toxic quantity of a nematocidal composition comprising as the essential active ingredient a quaternary morpholinium salt of the formula

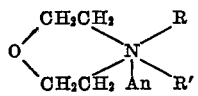

where An is the anion of a strong acid, R is a lower alkyl radical, and R' is a tridecylpolyoxyethylene residue derived by removal of the terminal hydroxyl group from the condensation product of ethylene oxide with a mixture of isomeric primary tridecyl alcohols, said alcohols being derived by the catalytic reaction of carbon monoxide and hydrogen with an olefin material selected from the class consisting of triisobutylene and tetrapropylene, said condensation product containing at least 5 moles and not in excess of 20 moles of ethylene oxide per mole of tridecyl alcohol.

2. A method of controlling nematodes which comprises exposing said nematodes to a toxic quantity of a nematocidal composition comprising as the essential active ingredient N-methyl-N-(tridecylpolyoxyethylene)-morpholinium p-toluenesulfonate, wherein the tridecylpolyoxyethylene radical is a residue derived by removal of the terminal hydroxyl group from the condensation product of ethylene oxide with a mixture of isomeric primary tridecyl alcohols, said alcohols being derived by the catalyzed reaction of carbon monoxide and hydrogen with an olefin material selected from the class consisting of triisobutylene and tetrapropylene, said condensation product containing about 8.5 moles of ethylene oxide per mole of tridecyl alcohol.

3. A nematocidal composition comprising as the essential effective ingredient an aqueous solution of a quaternary morpholinium salt of the formula

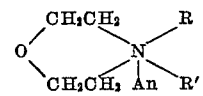

where An is the anion of a strong acid, R is a lower alkyl radical, and R' is a tridecylpolyoxyethylene residue derived by removal of the terminal hydroxyl group from the condensation product of ethylene oxide with a mixture of isomeric primary tridecyl alcohols, said alcohols being derived by the catalytic reaction of carbon monoxide and hydrogen with an olefin material selected from the class consisting of triisobutylene and tetrapropylene, said condensation product containing at least 5 moles and not in excess of 20 miles of ethylene oxide per mole of tridecyl alcohol.

4. A nematocidal composition comprising as the essential effective ingredient an aqueous solution of N-methyl - N - (tridecylpolyoxyethylene)morpholinium p-toluenesulfonate, wherein the tridecylpolyoxyethylene radical is a residue derived by removal of the terminal hydroxyl group from the condensation product of ethylene oxide with a mixture of isomeric primary tridecyl alcohols, said alcohols being derived by the catalyzed reaction of carbon monoxide and hydrogen with an olefin material selected from the class consisting of triisobutylene and tetrapropylene, said condensation product containing about 8.5 moles of ethylene oxide per mole of tridecyl alcohol.

References Cited in the file of this patent

UNITED STATES PATENTS

| | | |
|---|---|---|
| 2,302,388 | Hester | Nov. 17, 1942 |
| 2,581,285 | Niederl | Jan. 1, 1952 |

FOREIGN PATENTS

| | | |
|---|---|---|
| 746,108 | Germany | Dec. 23, 1943 |